UNITED STATES PATENT OFFICE.

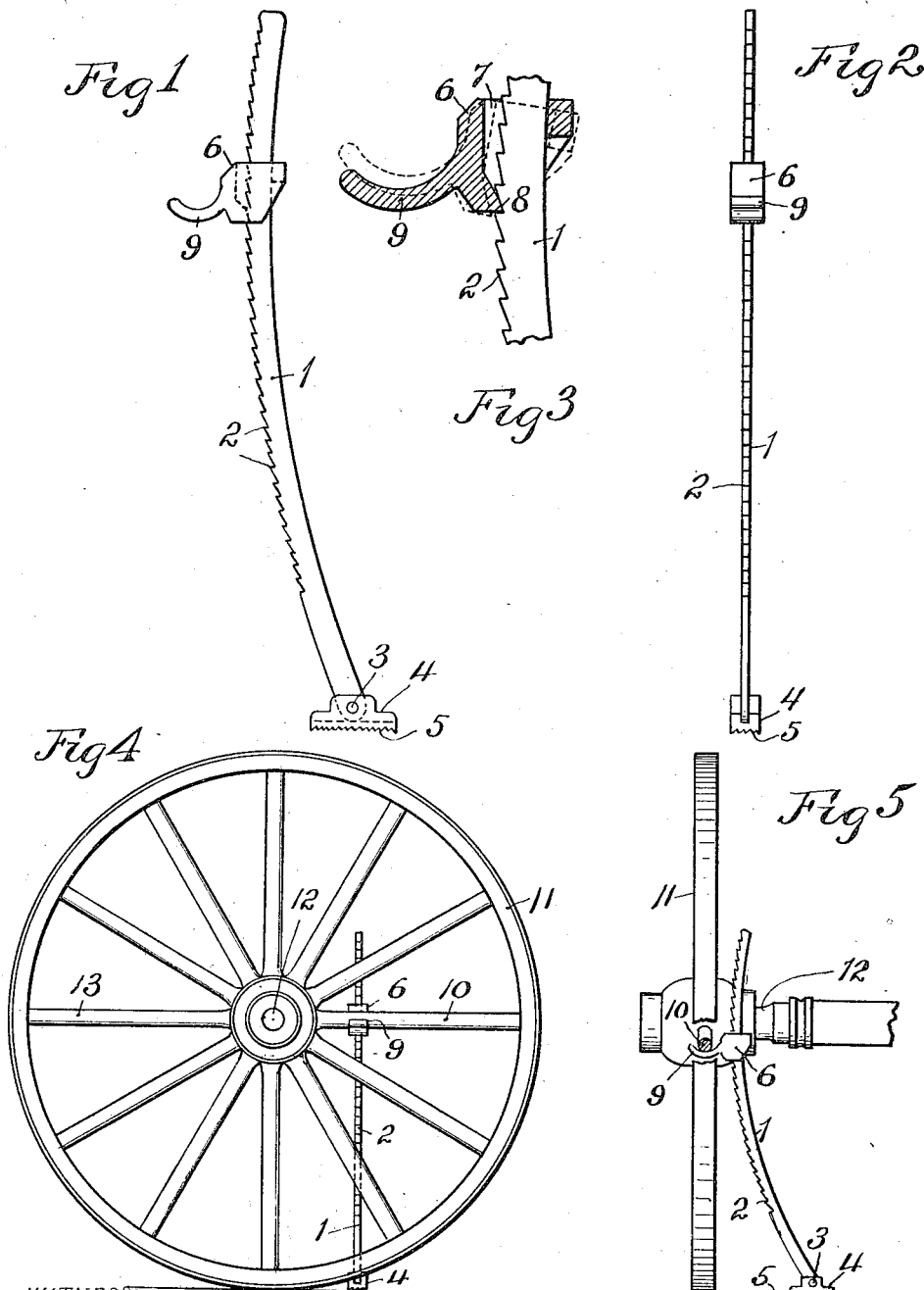

LLOYD J. ROBBINS, OF POMONA, KANSAS.

WAGON-JACK.

1,289,268.

Specification of Letters Patent.   Patented Dec. 31, 1918.

Application filed July 7, 1917.   Serial No. 179,233.

*To all whom it may concern:*

Be it known that I, LLOYD J. ROBBINS, a citizen of the United States, residing at Pomona, in the county of Franklin and State of Kansas, have invented a certain new and useful Improvement in Wagon-Jacks, of which the following is a specification.

My invention relates to improvements in wagon jacks.

The object of my invention is to provide a jack which is simple in construction, which is cheap to manufacture, which may be easily operated, which is durable and not liable to get out of order, and which may be employed to slip a wheel partly off from an axle and to then replace the wheel to its operative position.

The novel features of my invention are hereinafter fully described and claimed.

In the accompanying drawing which illustrates the preferred embodiment of my invention, Figure 1 is a side elevation of my improved wagon jack.

Fig. 2 is an edge elevation of the same.

Fig. 3 is an enlarged view of a portion of the jack shown partly in side elevation and partly in vertical section.

Fig. 4 is an edge elevation of my improved jack shown applied to a wagon wheel.

Fig. 5 is a side elevation of the jack, shown applied to a wagon wheel, a portion of which is broken away.

Similar reference characters designate similar parts in the different views.

1 designates a bar, preferably curved, and provided, preferably, in its convex edge with a longitudinal row of teeth 2.

The bar 1 is adapted to swing upon and to be supported by its lower end, and, preferably, its lower end is pivoted by a transverse pin 3 to a supporting shoe 4, the under side of which is provided with a plurality of projections 5 designed to prevent the shoe from slipping on the ground. Longitudinally slidable on the bar 1 is a supporting member 6, having a longitudinal hole through which the bar 1 extends, and provided with a tooth 8, Fig. 3, adapted to engage and to be supported by any one of the teeth 2.

The member 6 at the side having the tooth 8 is provided with a laterally extending arm 9 which is concave on its upper side and which is adapted to engage and support a spoke 10 of a vehicle wheel 11.

In operating my invention to partly remove the wheel 11 from the axle spindle 12 on which it is mounted, the shoe 4 is placed upon the ground at the inside of the wheel 11 forward of the axle with the bar 1 inclining outwardly as shown in Fig. 5. The supporting member 6 is slipped to a position in which the arm 9 may engage a horizontal spoke 10 which is forward of the spindle 12, as shown in Fig. 4. The operator then grasps the spoke 13 which is opposite to the spoke 10 and lifts upwardly on the spoke 13. The wheel is thus employed as a lever for lifting the weight of the wheel from the ground. As the spoke 13 is being lifted, the wheel will turn clockwise, as viewed in Fig. 4, thereby swinging outwardly the upper end of the bar 1, which in turn will force the wheel outwardly partly off from the spindle 12.

After the wheel has been moved outwardly to the desired position, the spoke 13 is released, thus permitting the wheel to again be supported upon the ground.

After the spindle has been greased, the wheel may be again slipped to its operative position by removing the jack and placing it at the outer side of the wheel with the position of the parts reversed from that shown in Fig. 5. The arm 9 is again engaged with the spoke 10, after which the spoke 13 is again grasped and lifted, thereby forcing the wheel to its original position, due to the inward and upward inclination of the bar 1 in the new position.

The bar is preferably curved, as shown, so that it may be used upon wheels of small diameter, as well as upon those of larger diameters, without having the upper end of the bar interfere with the proper operation of the jack. In order to be effective, for sliding the wheel on the spindle, the bar 1 must incline to the perpendicular. A straight bar, so positioned, could not be satisfactorily used for wheels of large and small diameters. By employing a curved bar, as shown, such use is afforded.

I do not limit my invention to the structure shown and described, as modifications, within the scope of the appended claims, may be made without departing from the spirit of my invention.

What I claim is:—

1. A wagon jack comprising a curved bar, a shoe pivoted to and supporting the bar, and a supporting member longitudinally slidable on said bar and having means for being releasably locked thereto in different positions and provided with means for engaging and supporting a spoke of a vehicle wheel.

2. A wagon jack comprising a curved bar having a longitudinal row of teeth and adapted to swing upon and to be supported by its lower end, and a supporting member longitudinally slidable on said bar and adapted to engage and to be supported by any one of said teeth and having means for engaging and supporting a spoke of a vehicle wheel.

3. A wagon jack comprising a curved bar having a longitudinal row of teeth, a shoe pivoted to and supporting said bar, and a supporting member longitudinally slidable on said bar and adapted to engage and to be supported by any one of said teeth, and having means for engaging and supporting a spoke of a vehicle wheel.

4. A wagon jack comprising a curved bar having on its convex edge a longitudinal row of teeth, a shoe pivotally supporting the lower end of the bar, and a supporting member longitudinally slidable on said bar and having a tooth adapted to engage and be supported by said teeth and provided at the side having the tooth with a laterally extending arm adapted to engage and support a spoke of a vehicle wheel.

5. A wagon jack comprising a curved bar having on its convex edge a longitudinal row of teeth, a shoe pivotally supporting said bar, and a supporting member longitudinally slidable on said bar and having a tooth adapted to engage and to be supported by said teeth and provided at the side having the tooth with a laterally extending arm having a concave upper side adapted to receive and support a spoke of a vehicle wheel.

In testimony whereof I have signed my name to this specification.

LLOYD J. ROBBINS.

Copies of this patent may be obtained for five cents each, by addressing the "Commissioner of Patents, Washington, D. C."